United States Patent

[11] 3,599,312

[72] Inventor  Franklin C. Hitzeroth
              Centerville, Iowa
[21] Appl. No  18,256
[22] Filed     Mar. 10, 1970
[45] Patented  Aug. 17, 1971
[73] Assignee  McGraw-Edison Company
              Elgin, Ill.

[54] TOASTER TIMER HAVING EXTERNAL ADJUSTMENT
9 Claims, 7 Drawing Figs.

[52] U.S. Cl. ................................................. 99/329
[51] Int. Cl. ................................................. A47j 37/08
[50] Field of Search ...................................... 99/329,
       326, 327, 328, 333, 334, 335; 73/15

[56] References Cited
UNITED STATES PATENTS

| | | | |
|---|---|---|---|
| 3,029,725 | 4/1962 | Parr | 99/329 |
| 3,175,482 | 3/1965 | Olson | 99/329 |
| 3,361,053 | 1/1968 | Jepson et al. | 99/329 |
| 3,418,917 | 12/1968 | Sato | 99/329 |
| 3,452,670 | 7/1969 | Huck et al. | 99/329 |

Primary Examiner—Billy J. Wilhite
Attorney—Charles F. Lind

ABSTRACT: A bimetal timing mechanism having first and second externally actuated adjustment means that change the orientation of the bimetal relative to the release latch means effective thereby, respectively, to factory calibrate the mechanism to its particular use, such as in a toaster for timing the toasting cycle, and to accurately vary this factory-set cycle control for individually satisfying the user's preferences.

PATENTED AUG 17 1971

Inventor:
Franklin C. Hitzeroth
By Charles F. Lind
Attorney

Inventor:
Franklin C. Hitzeroth
By Charles F. Lind
Attorney

TOASTER TIMER HAVING EXTERNAL ADJUSTMENT

The Henry L. Olson U.S. Pat. No. 3,175,482 discloses a bimetal timing mechanism that is particularly effective for accurate control of the cooking cycle of a electric appliance, such as a toaster. The timing mechanism is unitary and thus can be fabricated and adjusted in its entirety at one location and then with few connections secured in place on the toaster chassis. The bimetal element is heated both by its separate heating element and the appliance heater, and thus is influenced by heat buildup. This compensates automatically to vary the cycle length as between the initial and successive operating cycles to give the desired toast color. The timer bimetal deflects under the heating influence of both heating elements to release a first latch that effectively deenergizes the bimetal heating element only, whereupon the bimetal cools slightly to release a second latch that deenergizes the toaster heating elements. Gauges are used to factory calibrate the timing mechanism to the particular toaster appliance and a single external adjustment is provided for customer fine tune or preference control of the cycle. Since each toaster is actually operated after factory calibration and the resulting toast color compared to an accepted standard, if the standards are not met, the toaster must be cooled, recalibrated, and retested. This special handling, on improperly calibrated appliances, is not only time consuming but also appreciably adds to the overall cost of the toaster.

In the subject invention, first and second externally actuated adjustment means are provided for varying the bimetal deflection required to trip the latch means to provide both accurate factory calibration of the timing mechanism to the particular appliance but also individual preference adjustments. Consequently it is now possible by varying one adjustment means to calibrate the timing mechanism to the toaster on the testing cycle without later disassembling or retesting the toaster while further with a second adjustment means to allow fine-tune individual control by the user.

Accordingly, a main object of this invention is to provide for use in a cooking appliance like a toaster, a bimetal timing mechanism having first and second adjustment means, each externally actuated, suited for factory calibration of the timing mechanism to the appliance and for offering individual preference control to the user.

This and other objects of the invention will be more fully understood after reviewing the following specification, including the drawings, wherein.

Figure 1:
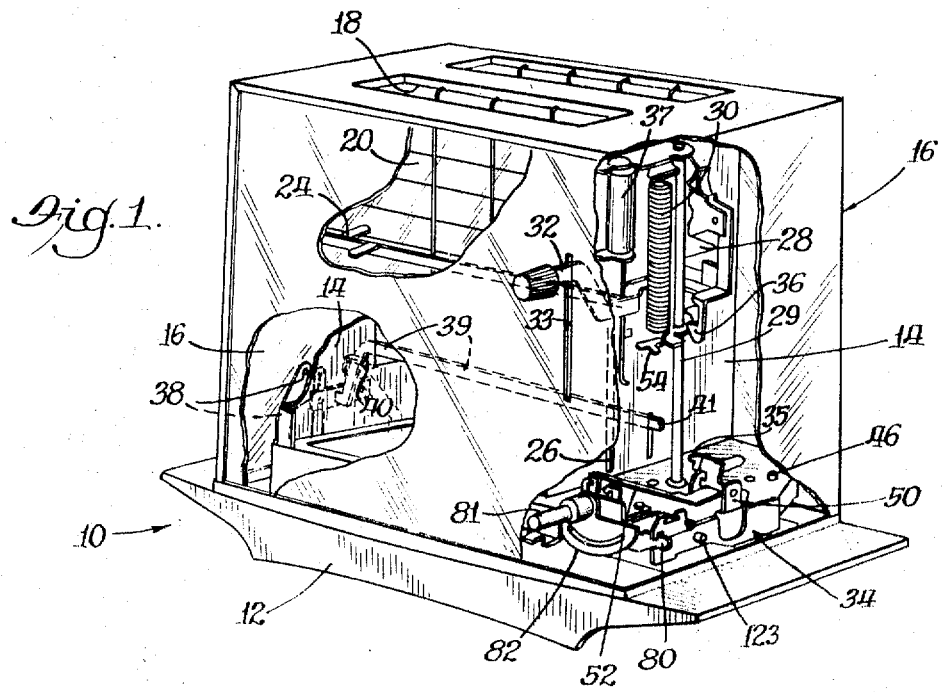
FIG. 1 is a perspective view of a toaster having a bimetal timing mechanism forming a part thereof, with part of the toaster case being broken away for convenience of disclosure.
Figure 2:
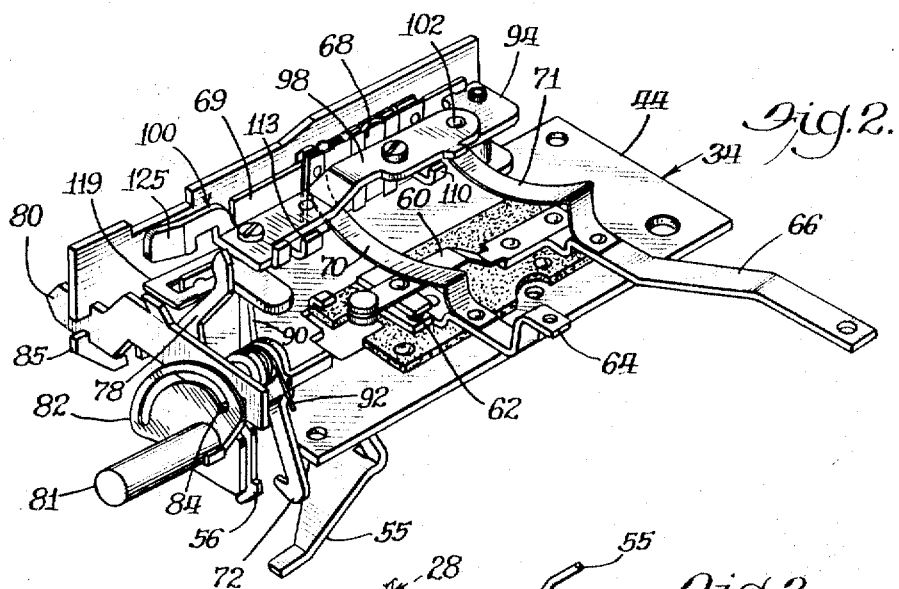
FIG. 2 is a perspective view of the underside of the timing mechanism used with the disclosed toaster, and showing a preferred embodiment of the particular invention.

Referring to FIG. 1, the illustrated toaster 10 includes a base 12 of phenolic or other insulating material supporting thereon a chassis 14 and overlying case 16. The chasses 14 and case 16 each is formed of a sheet material construction in a typical manner having bread-receiving slots 18 that open to between opposing heating elements 20. A bread-holding arm 24 extends from between the heating elements through a slot 26 in the toaster chassis 14 and is secured to carriage 28. The carriage 28 rides on rod 29, and spring 30 biases the carriage to the upper nontoasting position while lever 32 extended through case slot 33 provides for manually lowering the carriage to the toasting position. A timing mechanism 34 has lock 35 that engages carriage hook 36 to hold the carriage in the lowered toasting position, while the lock is movable also to release the carriage for return movement to the elevated nontoasting position. Air-snubbing device 37 dampens the upward movement of the carriage. When the carriage is in the lower toasting position, a pair of leaf contacts 38 are closed through the action of lever 39 pivoting at 40 and abutted at 41 by the carriage which provides power to the toaster heating elements 20.

Figure 3:
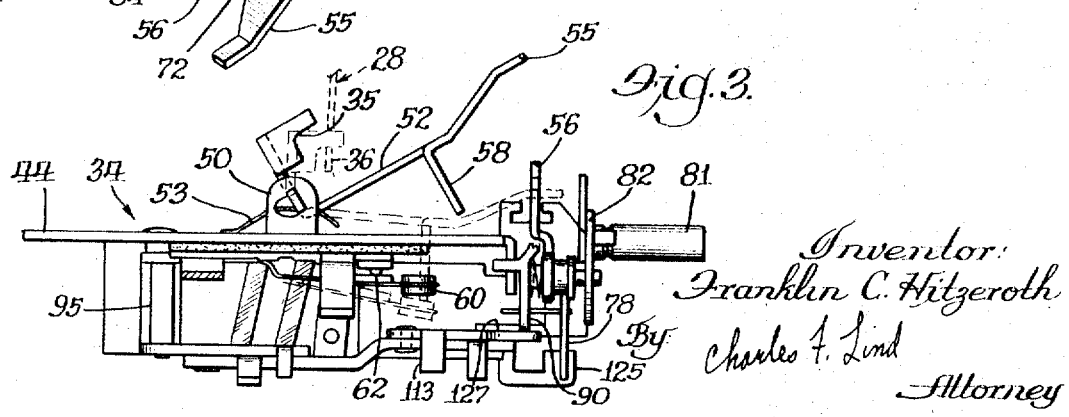
FIG. 3 is a rear elevational view of the timing mechanism shown in FIG. 2.
Figure 4:
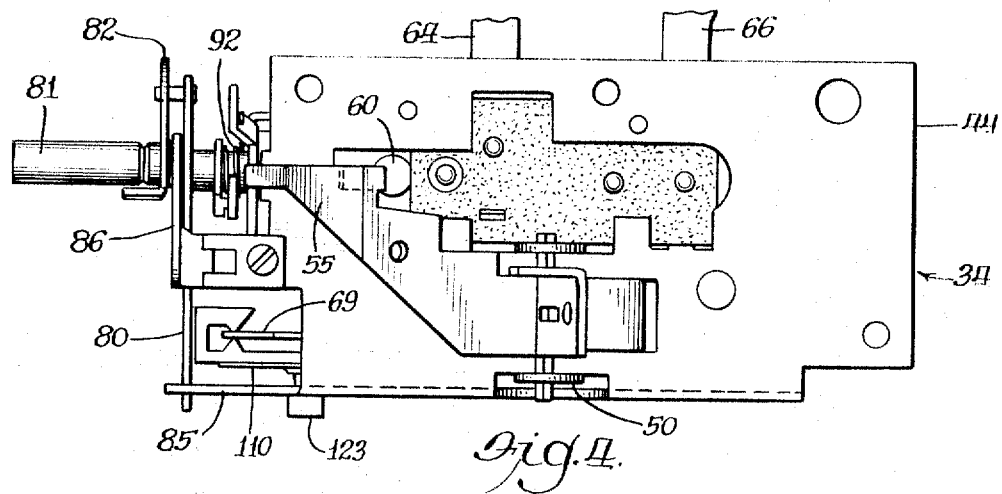
FIG. 4 is a top plan view of the timing mechanism shown in the previous figures.
Figure 5:
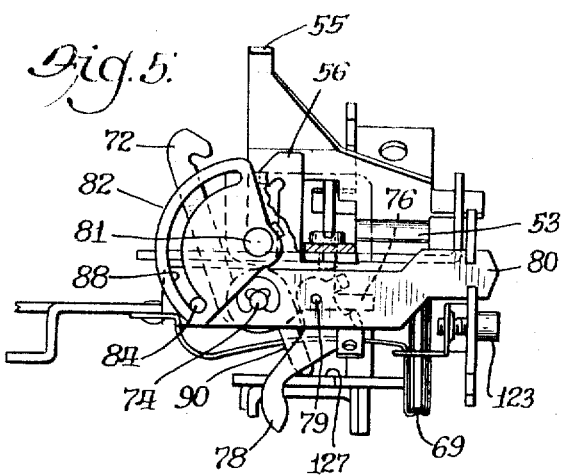
FIGS. 5 and FIG. 6 are elevational views, as seen from the left of FIG. 4, showing the timing mechanism in different operative views.
Figure 6:
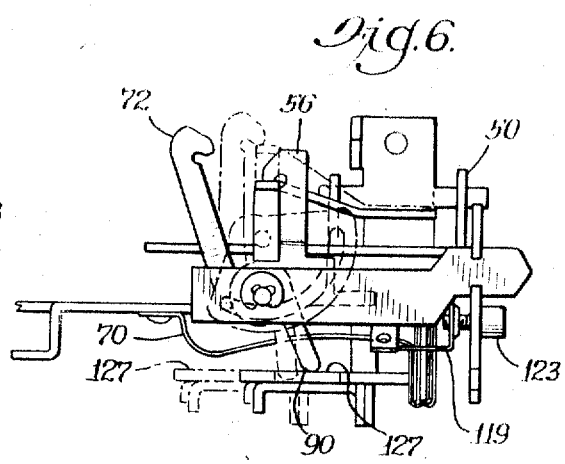
Figure 7:
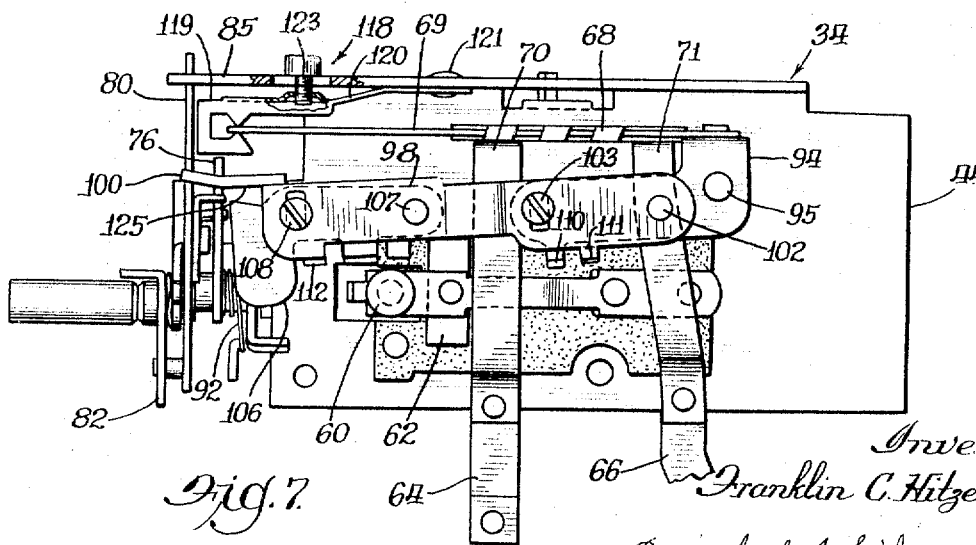
FIG. 7 is a bottom plan view of the timing mechanism disclosed in the previous figures.

The bimetal timing mechanism 34 shown has a generally L-shaped base 44 which is secured to the toaster chassis 14 as by screws 46. Upstanding spaced ears 50 formed from the base 44 pivotally support therein element 52 on which the lock 35 previously mentioned is located, and spring 53 tends to rotate the lock element to the released position (FIG. 3). When the carriage is lowered by the operating lever 32, a part 54 thereof (FIG. 1) engages the element 52 to pivot it about the ears 50 until the lock 35 overlies hook 36 and further the free end 55 of the element 52 trips and is held down by latch 56. When the element 52 is held depressed by latch 56 a finger 58 thereon extends through an opening in the base 44 and engages a leaf spring element 60 and separates thereby a pair of contacts 62. The contacts are connected in series through the leaf element 60 across terminals 64 and 66 so that when the leaf contacts 62 are closed the terminals are in direct shorting connection with one another. A heating element 68 is supported in heat-distributing relation on a bimetal element 69 and flexible leads 70 and 71 therefrom are connected to the respective terminals 64 and 66, so that the heating element 68 is in parallel with the leaf spring and contacts. In effect, the terminals 64 and 66 are under power when toaster contacts 38 are closed.

When the lock element 52 is depressed completely and held down by the latch 56 so the finger 58 opens the contacts, the terminals connect only across the bimetal heating element 68 to energize the element; in all other positions of lock element 52 the finger releases the leaf spring 60 to close the contacts 62 which short circuits across the terminals to in effect deenergize the bimetal heating element. It is at this time when the latch 56 is released and latch 72 engaged that the bimetal heating element is deenergized and allowed to cool down, while however the toaster heating elements 20 are yet energized.

Referring now to the specific construction of the various latch elements 56 and 72, the latch element 56 is pivoted at 74 to a vertical leg of the base, and moreover has a finger 76 that extends laterally of the pivot. A trigger release element 78 for actuating latch 56 is pivoted at 79 to a laterally movable member 80, which member has a slot to receive pin 74 and which further fits within grooves in vertical leg 85 of the base. The latch finger 76 extends between spaced guides on the trigger release element 78 so as to tie the rotational movements of the latch 56 and the trigger release element 78 together even while the trigger element 78 can be laterally moved relative to the latch element 56.

An external adjustment means is provided to move this element 80 laterally to accommodate a preference setting of the toasting apparatus. The external control knob (not shown) is pivoted to rotate about a post 81 secured to base leg 86, and the knob is keyed to a cam plate 82 which likewise is supported to rotate about the post. A pin 84 secured to the laterally moving element 90 is received in a cam slot 88 eccentrically disposed relative to the post 81, so that upon rotation of the cam plate 82 the pin is caused to move laterally of the post. This likewise changes the location of the trigger element 78 relative to base leg 85. This particular control means is suitable for use by the housewife to fine-tune control the toaster cycle.

The second latch 72 is a one piece element which is pivoted about the same pin 74 and has the upper latch configuration and a lower trigger element 90. A single spring 92 coiled about the pin 74 biases the latches 56 and 72 toward the locking positions normally, unless other means to be discussed now tend to move the latch otherwise.

THe bimetal element 69 is secured to a yoke 94 that pivotally rotates on pin 95 projecting from the base 44. A trip arm 98 is also secured rigidly to the yoke 94 so that at least at the yoke, it rotates with the bimetal. The trip arm 98 is typically formed of several components which are adjustably mounted relative to one another but which are normally locked tight in operation. The arm construction shown has trigger 78 actuating extension element 100 which is secured adjustably to the yoke by means of a pivot rivet 102 and an adjusting screw 103 threaded into the yoke and received within a slot in the extension element. Additionally, trigger 90 actuating extension element 106 is secured to the extension element 100 by means of a similar pivot rivet 107 and screw 108 construction. Upstanding ears, 110 being formed from the yoke 94, 111 and 112 being formed from the extension element 100, and 113 being formed from extension element 106 respectively are located in pairs 110 and 111, and 112 and 113 such that a gauge can fit between each pair and upon properly loosening the lock screw used to orient the components angularly relative to one another.

A second adjustment means 118 is formed by a movable element 119 holding the free end of the bimetal 69. Retaining element 119 thus is supported on a leaf spring 120 which is secured as at 121 to the leg 85 of the base 44. The spring has an opening therein cooperating threadably with a screw element 123, which screw is supported rotatably by appropriate means within a slotted opening in the leg 85. A key socket on the screw permits it to be rotated to in effect move the engagement of the screw with the spring to shift the free end of the bimetal toward or away from the base leg 85. This also shifts the location of the free end of the trip arm 98 in a like manner. The case 16 has an opening in alignment with the screw 123 to provide for the ready insertion of an adjusting tool from outside of the toaster.

It is generally noted that face 125 on extension element 100 cooperates to engage trigger 78 upon movement of the trip lever away from the base leg 85; while extension element 106 has a face 127 that ordinarily engages and holds the trigger 74 in a manner that its latch 72 is in the released position until sufficient movement of the trip lever away from the base leg 85 permits the trigger to ride off the face 127 to permit the spring 92 to move the latch 72 to its latching position overlying the element 52. The bimetal 69 is designed upon heating deflection to move the trip lever 98 away from the base leg 85 and upon cooling deflection to move toward the base leg. The heating deflection of the bimetal thus will sequentially set the latch 72 and release latch 56, and cooling deflection will release the latch 72.

In this regard, the gauging between the yoke 94 and the extension element 100 locates the actuating face 125 of the trip arm relative to the free end of the bimetal such that the heating deflection required of the bimetal can be set generally within specific broad limits. The gauging between the extension elements 100 and 106 determines the cooling deflection required between when the first latch is tripped and the second latch is tripped, which is known as the cooldown time. Each setting is preferably made by means of a specific gauge and generally calibrates the timing mechanism to its end use appliance. It is also possible to provide that the latch 72 is not even set by the time the latch 56 is released such that the lock element 52 is immediately released to permit the carriage to move to the nontoasting elevated positions and to deenergize both the bimetal heating element 68 and the toaster heating elements 20. This eliminates the cooldown cycle entirely.

Although experience dictates quite accurately the particular actual average times required for a proper toasting cycle, and such can be generally satisfied by the gauge settings of the trip lever 98, external adjustment is needed for more reliable control. FOr example, the total time required for a toasting cycle, with a cold-starting toaster, might be 2 minutes; where a designed initial cooldown cycle of 30 seconds is included. THe gauging of the timing mechanism can be completed to give this general control, and the toaster can be tested then. If the cycle is too long or too short, it is possible merely by external manipulation of the screw 123 to vary the orientation of the bimetal sufficiently to bring it into the proper cycle time. It is also possible to back off the screw after the time required has lapsed for causing the face 125 to release the latch 56 at that instant. This latch release can be detected by an operator by means of a glow lamp or ammeter in series with the toaster because of the increase in amperes caused by the shunting across closed contacts 62 of the high resistant bimetal heating element 68. In fact, it is also possible to calibrate an entire bank of like toasters in a single test with each toaster being sequentially energized at a few seconds increment where the operator after the required initial time lapses and going from toaster to toaster in the same sequence as the toasters were started manually releases the respective toaster latch 56.

What I claim is:

1. In a toaster having a case holding heating elements, and a bread support carriage movable therein between a toasting position whereat the heating elements are energized and a nontoasting position, an improved timing mechanism including a latch effective in a locking position to hold the carriage in the toasting position and in a release position to permit the carriage to move to the nontoasting position, comprising a trigger element coupled to the latch for shifting the latch from the locking position to the release position, a bimetal and trip means connected thereto to be moved thereby, means restraining the bimetal against movement at one location such that the trip means at a second location moves toward and away from the trigger element responsive to temperature variation of the bimetal, first adjustment means for moving the trigger element relative to the latch to adjustable distances from the trip means and second adjustment means for moving the bimetal restraining means to adjustable positions whereby adjustment of either is effective to vary the deflection required of the bimetal to move the trip means sufficiently to actuate the trigger element for shifting the latch to the release position, and first and second means for adjusting the first and second adjustment means respectively from the exterior of the case.

2. A timing mechanism according to claim 1, wherein the first adjustment means includes an element to which the trigger element is pivoted, and means to support the element for movement toward and away from the trip means.

3. A timing mechanism according to claim 2, wherein the first means for adjusting the first adjustment means includes a cam plate and means to support the cam plate for rotation about an axis fixed relative to the latch, and follower means coupled to the element and cooperating with the cam plate to move the element responsive to rotation of the cam plate.

4. A timing mechanism according to claim 1, wherein the second adjustment means includes an element that is coupled to the bimetal at the one location and serves as the restraining means, and means to support the element for movement toward and away from the trigger element.

5. A timing mechanism according to claim 4, wherein the second means for adjusting the second adjustment means includes a screw and means to rotatably support the screw to effect thread advance thereon along an axis fixed relative the latch and in a direction transverse to the element, and follower means coupling the screw to the element to move the element responsive to rotation of the screw.

6. A timing mechanism according to claim 1, wherein the first adjustment means includes a first element to which the trigger element is pivoted, means to support the first element for movement toward and away from the trip means, wherein the second adjustment means includes a second element that is coupled to the bimetal at the one location and serves as the restraining means, and means to support the second element for movement toward and away from the trigger element.

7. In a toaster having a case holding heating elements, and a bread support carriage movable therein between a toasting position whereat the heating elements are energized and a nontoasting position, an improved timing mechanism including a base and a latch pivoted to the base effective in a locking position to hold the carriage in the toasting position and in a release position to permit the carriage to move to the non-toasting position, comprising a trigger element and a slide pivotally supporting said trigger element, means coupling the trigger element rotatably to the latch for shifting the latch from the locking position to the release position upon rotation of the trigger element, a bimetal and trip means connected thereto to be moved thereby, a restraining element coupled to the bimetal at one location restraining movement thereof such that the trip means at a second location moves toward and away from the trigger element responsive to temperature variation of the bimetal, means supporting the slide to move and with it carry the trigger element relative to the latch to adjustable distances from the trip means, means supporting the bimetal restraining element to move to adjustable positions whereby the trip means is moved correspondingly to adjustable distances from the trigger means, and first and second means for adjusting the positions of the slide and of the bimetal restraining element each operable from the exterior of the case, whereby adjustment of either is effective to vary the deflection required of the bimetal to move the trip means sufficiently to actuate the trigger element for shifting the latch to the release position.

8. A timing mechanism according to claim 7, further including a bimetal heating means, and means operable when the latch is in the locking position to energize the bimetal heating means.

9. A timing mechanism according to claim 7, wherein one of the first and second externally operable means includes a control element that is normally exposed on the exterior of the case and the other of the first and second externally operable means is provided with means including an opening in the case which permits the insertion therethrough of a tool suitable to actuate the means.